Oct. 12, 1926.
V. H. TODD
1,602,954
GRAPHIC METER REROLL DEVICE
Filed August 8, 1922
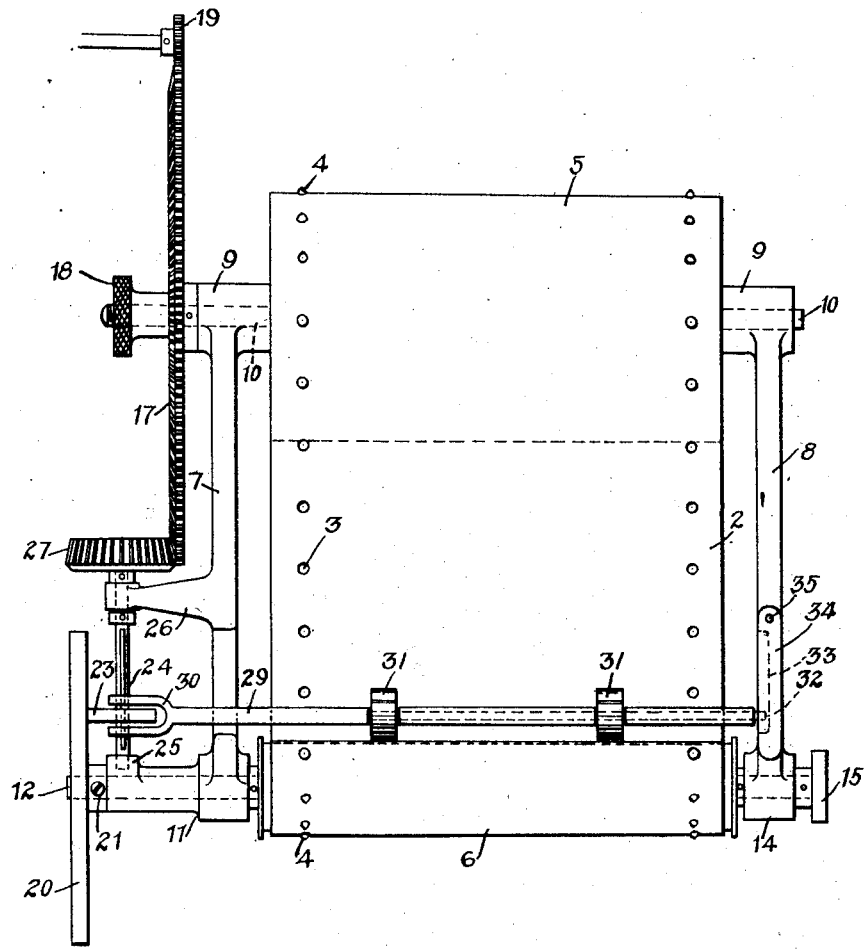
WITNESSES:
INVENTOR
Victor H. Todd
BY
ATTORNEY Patented Oct. 12, 1926.

1,602,954

UNITED STATES PATENT OFFICE.

VICTOR H. TODD, OF SUMMIT, NEW JERSEY, ASSIGNOR TO WESTINGHOUSE ELECTRIC & MANUFACTURING COMPANY, A CORPORATION OF PENNSYLVANIA.

GRAPHIC-METER REROLL DEVICE.

Application filed August 8, 1922. Serial No. 580,531.

My invention relates to recording of graphic meters and particularly to means for controlling the rerolling or take-up of the movable charts thereof.

One object of my invention is to provide a device of the above-indicated character that shall be simple and durable in construction, economical to manufacture and effective in its operation.

Another object of my invention is to provide a chart reroll device for a graphic meter that shall automatically change the angular velocity of the take-up member as the chart is wound thereon.

Heretofore, in recording meters employing rolled paper charts, it has been difficult to maintain the chart in proper tension and position by reason of the constantly increasing diameter of the take-up roll. If the take-up roll has a constant angular velocity, the linear velocity of the chart so increases as to cause the chart to climb off guiding pins, that are provided on a guide roller, and to stop the meter. Accordingly, a great deal of inconvenience and loss of records have resulted.

It has been suggested to employ a slip-clutch arrangement between the driven take-up roller and the driving means therefor but, in such device, the speed of rotation of the take-up member does not change constantly and the tension in the chart is not absolutely constant.

In practicing my invention, I provide a variable-speed driving mechanism that is positively connected to the take-up member and is controlled to accurately change the speed of the chart as the latter is wound on the take-up member.

The single figure of the accompanying drawing is a front view of a portion of a recording meter, showing the take-up mechanism of my invention.

A flexible element or chart 2, preferably of paper, for co-operation with a pen or stylus of a meter mechanism (not shown), may be provided with uniformly longitudinally-spaced side openings 3 which register with pins 4 on a feed roller 5 and a take-up roller 6.

The roller 5 may be suitably supported by brackets 7 and 8 that are provided with bearings 9 for the reception of a shaft or trunnion 10 of the roller 5. The bracket 7 is provided, at one end, with a bearing 11 for a shaft or trunnion 12, at one end of the take-up roller 6, and the bracket 8 is provided, at one end, with a bearing 14 for the reception of a plunger release pin 15, constituting a shaft or trunnion that supports the other end of the take-up roller 6 and permits the latter to be removed from operative position.

A combination spur-and-bevel gear wheel 17, feathered or keyed to the shaft 10 and held in position by a nut 18, engages a spur-gear pinion 19 that is driven by a clock or other device (not shown). A friction disk wheel or driven member 20 is secured, as by a set screw 21, to the trunnion 12 and is adapted to engage a driving friction wheel 23. The latter is splined or otherwise mounted on a shaft 24 to rotate with the latter and to move longitudinally thereon. The shaft 24 is mounted, at one end, in a bearing portion 25 of the bracket 7 and, at the other end, in a bearing arm 26 projecting from the bracket 7. A bevel pinion 27, secured to the shaft 24, engages the bevel gear portion of the wheel 17.

A horizontal arm member 29 is provided, at one end, with a bifurcated portion 30 which straddles the friction wheel 23 and is provided with openings by which it slidably surrounds the shaft 24. Roller members 31, of which there may be only one or any desired number, are rotatably mounted on the arm 29 and rest on the upper portion of the chart 2 that has been wound on the take-up roller 6. The end 32 of the arm 29 may be mounted in a slot 33 in the bracket 8 to permit movement of the arm in accordance with changes in the diameter of the rolled chart on the member 6 and held in position by a clip or retaining member 34 pivoted, by a pin 35, on the bracket 8.

In operation, the guide roller 5 and the shaft 24 will be driven, by the gear wheels 19, 17 and 27, at constant rates of speed. However, as layers of the chart 2 are superposed on the take-up member 6, the arm 29 will be moved upwardly. This movement is transmitted to the friction wheel 23 which thus moves along the shaft 24 to change the angular velocity of the friction wheel 20. The angular velocity of the take-up member 6 is thus changed as the chart is fed thereto, and the tension between the guide and take-up members 5 and 6, respectively, remains constant.

The device is not affected adversely by irregularities in the thickness of the chart and operates accurately with charts of different thickness.

While I have shown and described a particular form of my invention, changes may be effected therein without departing from the spirit and scope thereof, as set forth in the accompanying claims.

In claim as my invention:

1. In a graphic meter, the combination with a movable chart and feed and take-up rollers therefor, of means for driving said feed roller at a constant speed and said take-up roller at uniformly changing velocities as the position of the chart changes, including an arm normally extending across the chart, said arm being movable in accordance with increase of the chart on the take-up roller and pivoted adjacent to one end to be moved out of operative relation to the chart.

2. In a recording meter, the combination with a movable chart and feed and take-up rollers therefor, of constant-speed means for driving the feed roller, and variable-speed means for driving the take-up roller comprising a friction disk connected to the take-up roller in axial alinement therewith, a shaft connected to said constant-speed means extending radially with respect to the axis of the take-up roller at one side of the chart, a friction drive wheel for the disk adapted to rotate with the shaft and to move longitudinally thereon, a horizontal arm pivotally and longitudinally slidably mounted on said shaft to permit the arm to be pivoted about the shaft from a position over and parallel to the take-up roller to an outer position in any longitudinal position on the shaft, and a rotatable member on the arm adapted to rest on the chart on the take-up roller to move the arm longitudinally on the shaft.

3. In a recording meter, the combination with a movable chart and feed and take-up rollers therefor, of constant-speed means for driving the feed roller, and variable-speed means for driving the take-up roller comprising a friction disk connected to the take-up roller in axial alinement therewith, a shaft connected to said constant-speed means extending radially with respect to the axis of the take-up roller at one side of the chart, a friction drive wheel for the disk adapted to rotate with the shaft and to move longitudinally thereon, a horizontal arm pivotally and longitudinally slidably mounted on said shaft to permit the arm to be pivoted about the shaft from a position over and parallel to the take-up roller to an outer position in any longitudinal position on the shaft, a rotatable member on the arm adapted to rest on the chart on the take-up roller to move the arm longitudinally on the shaft, and means co-operating with the free end of said arm to guide the same during its longitudinal movement on the shaft and to release the same to permit its pivotal movement.

In testimony whereof, I have hereunto subscribed my name this 29th day of July, 1922.

VICTOR H. TODD.